United States Patent [19]

Blok

[11] Patent Number: 5,133,151
[45] Date of Patent: Jul. 28, 1992

[54] METHOD AND DEVICE FOR MINERAL WOOL CULTURE OF PLANTS WITH SUCTION PRESSURE CONTROL

[75] Inventor: Christiaan Blok, Roermond, Netherlands

[73] Assignee: Rockwool Lapinus B.V, Netherlands

[21] Appl. No.: 605,144

[22] Filed: Oct. 29, 1990

Related U.S. Application Data

[63] Continuation of Ser. No. 497,819, Mar. 22, 1990, abandoned, which is a continuation of Ser. No. 215,593, Jul. 6, 1988, abandoned.

[30] Foreign Application Priority Data

Jul. 6, 1987 [NL] Netherlands ............... 8701589

[51] Int. Cl.$^5$ ............................................. A01G 31/02
[52] U.S. Cl. ............................................. 47/64; 47/62; 47/80
[58] Field of Search ............... 47/9, 58–65, 47/79–82, 48.5

[56] References Cited

U.S. PATENT DOCUMENTS

| 2,336,755 | 12/1943 | Sejarto | 47/62 |
|---|---|---|---|
| 2,880,549 | 4/1959 | Knipe | 47/62 |
| 3,892,982 | 7/1975 | Holmes | 47/62 X |
| 4,045,909 | 9/1977 | Moss | 47/62 |
| 4,057,933 | 11/1977 | Enyeart | 47/62 X |
| 4,189,867 | 2/1980 | Schneck | 47/62 |
| 4,332,105 | 6/1982 | Nir | 47/62 X |
| 4,603,068 | 8/1986 | Powell, Jr. | 47/62 |
| 4,769,277 | 9/1988 | Meunier | 428/280 |
| 4,780,989 | 11/1988 | Mears et al. | 47/65 |
| 4,965,962 | 10/1990 | Akagi | 47/65 |

FOREIGN PATENT DOCUMENTS

| 0140443 | 5/1985 | European Pat. Off. . | |
| 0169687 | 1/1986 | European Pat. Off. . | |
| 0201426 | 12/1986 | European Pat. Off. . | |
| 2813410 | 10/1979 | Fed. Rep. of Germany | 47/59 |
| 2297562 | 8/1976 | France . | |
| 7704535 | 10/1978 | Netherlands . | |
| 8401638 | 12/1985 | Netherlands | 47/62 |
| 277439 | 7/1970 | U.S.S.R. | 47/62 |
| 281944 | 9/1970 | U.S.S.R. | 47/62 |
| 417127 | 7/1974 | U.S.S.R. | 47/62 |
| 631120 | 11/1978 | U.S.S.R. | 47/62 |
| 1042689 | 9/1983 | U.S.S.R. | 47/62 |
| 1976 | 4/1886 | World Int. Prop. O. | 47/62 |

OTHER PUBLICATIONS

"This is Rockwool", Supplement to the Grower, Nov. 8, 1979, pp. 19–21.
Tuinderij, No. 2 (G. Klomp).

Primary Examiner—Robert A. Hafer
Assistant Examiner—Kevin G. Rooney
Attorney, Agent, or Firm—Ostrolenk, Faber, Gerb & Soffen

[57] ABSTRACT

The invention relates to a method for the mineral wool culture of plants, whereby water and any fertilizers that may be comprised therein are supplied to, and if necessary discharged from, the mineral wool in which the plant grows, whereby in said mineral wool the suction pressure is adjusted using a capillary system connected for liquid communication with mineral wool, with which capillary system water and any required nutrients are actively supplied to and/or discharged from said mineral wool, in order to readjust the predetermined suction pressure; and to a device for the mineral wool culture of plants, comprising: mineral wool in which the plants can grow; means for supplying water and any fertilizers that may be comprised therein to said mineral wool; and means for discharging water and any fertilizers that may be comprised therein from said mineral wool, wherein a capillary system connected for liquid communication with said mineral wool, to which system are linked means for adjusting the suction pressure in said mineral wool in which the plant grows, and means for determining the actual suction pressure of the mineral wool, and based on the determined actual suction pressure control the amount of water supplied by the water supplying means and/or discharged by the water discharging means.

30 Claims, 3 Drawing Sheets

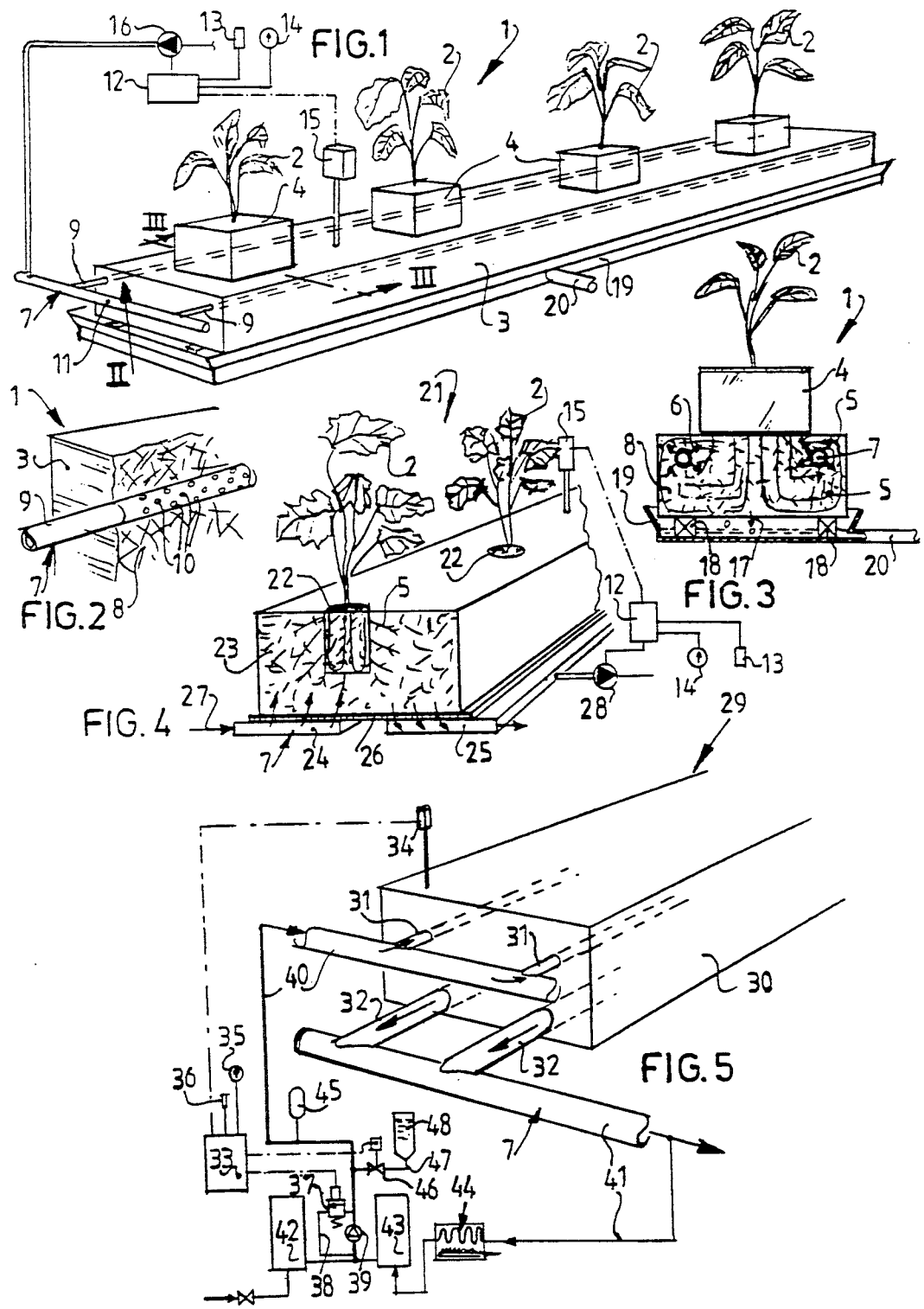

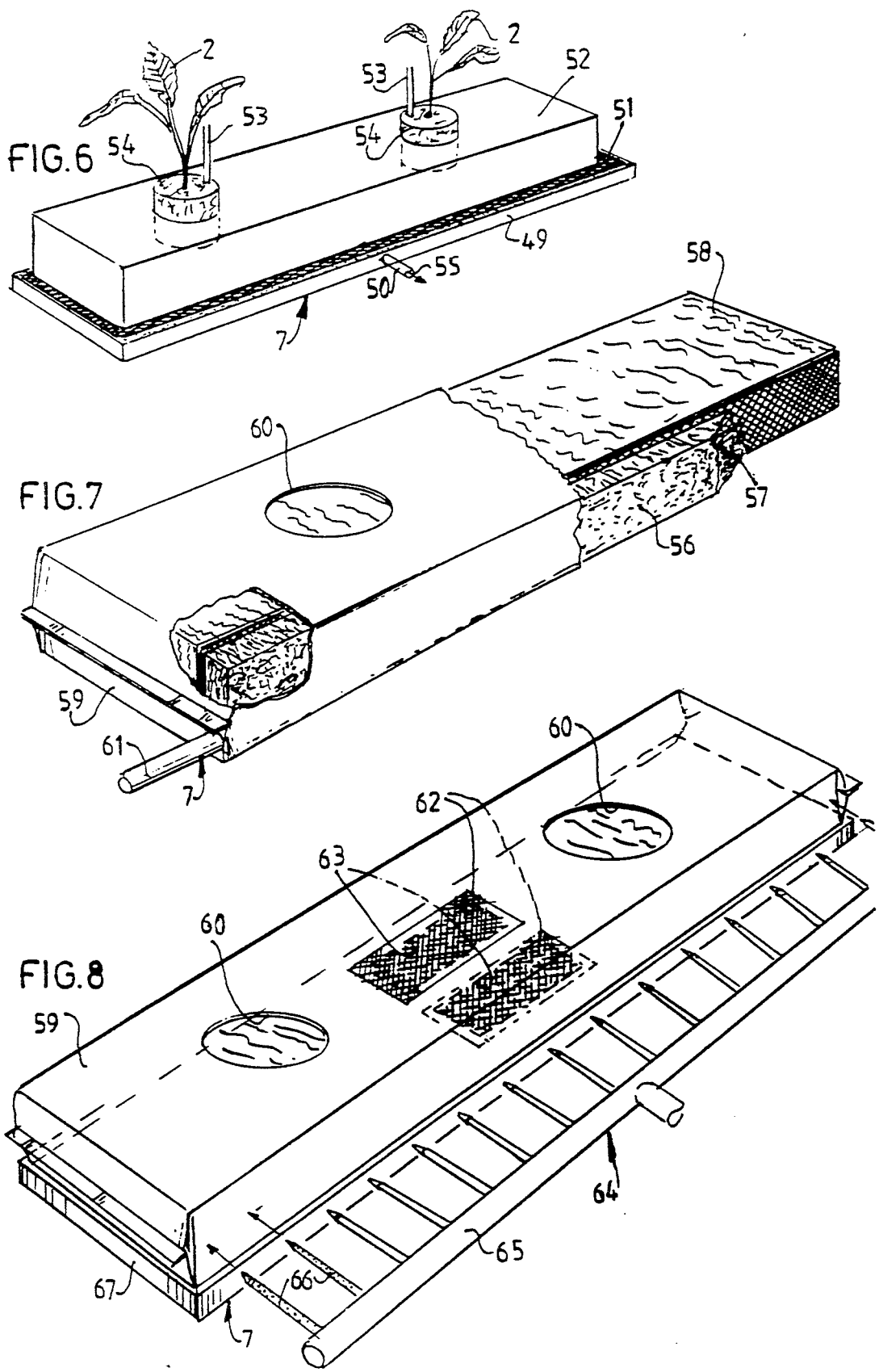

METHOD AND DEVICE FOR MINERAL WOOL CULTURE OF PLANTS WITH SUCTION PRESSURE CONTROL

This is a continuation of application Ser. No. 07/497,819, filed Mar. 22, 1990 now abandoned, which is a continuation of Ser. No. 07/215,593, filed on Jul. 6, 1988, now abandoned.

BACKGROUND OF THE INVENTION

The current invention relates to a method and device for the mineral wool culture of plants.

Plants which are cultivated in a substrate of mineral wool, particularly rock wool and glass wool, receive either periodical or continuous applications of water and, where required, fertilizer, such that cultivation conditions for the plants are optimal.

The physical properties of the mineral wool used determine among other things the quantity of water that the mineral wool contains, how the delivery of water to the plant takes place, and how water is again absorbed. These physical properties can be derived and forecast from the characteristic moisture curve, the so-called pF curve, of the mineral wool. pF is the suction pressure (negative hydraulic pressure, usually expressed in cm water column) and indicates, as a function of the current moisture content of the mineral wool, the force with which water is held by the mineral wool, or in other words, how much force the plant must generate in order to extract water from the mineral wool (Tuinderij (Market Gardening) 1986, p. 54 and 55).

In order to limit the force which the plant must generate to absorb water, the suction pressure in the mineral wool should be kept as low as possible. This is, however, only possible to a very limited extent, because the water management is directly linked to the air management in the mineral wool. If mineral wool contains more water, then the air (oxygen) content decreases, and as a result the air supply to the plant roots is inhibited. For each mineral wool, there is therefore an optimal water/air ratio.

At the current time in the mineral wool culture of plants, water and any required fertilizer are added either continuously or periodically to the mineral wool, in order to compensate for the quantity of water which has been taken up (absorbed) by the plants, which has evaporated and which has drained out of the mineral wool. The water application is hereby geared to the water requirement of the plant or the crane section with plants. In other words the plant or crane section with the largest water requirement dictates the size of the water application. This implies that the remaining plants (with a differing water requirement) are cultivated under sub-optimal conditions.

At the current time the desired water application is determined with so-called starting trays. A number of plants are cultivated separately in measuring boxes in conditions that are as far as possible the same; the water consumption of the plants is derived from the amount of water supplied and the amount of drainage water. The water requirement of the plants in the starting tray is in this way approximated and adjusted to the current water requirement of all the plants present. This measured water requirement should be a measure for the actual water supply at that moment. The quantity of water supplied is however not the same as the determined, current water requirement. On the one hand because the current water requirement of each plant cannot be determined, the cultivation conditions for the whole culture deviate locally, and on the other hand because the quantity of water delivered via the drippers is not everywhere exactly the same. In fact, a more than sufficient quantity of water is given as a result, the excess being drained off. This entails extra material costs for the water consumed and the fertilizer absorbed in it, and also forms an increasingly greater load on the environment. Cultivation conditions are moreover sub-optimal.

The invention has for its object in the mineral wool culture of plants to cultivate all plants as far as possible in the same optimal conditions, irrespective of differences between their individual water requirements. In accordance with the invention each plant in fact individually determines the amount of water it requires. At the same time the water absorption has no influence whatever on the water/air management of the other plants, particularly neighbouring ones.

The invention is based on the concept that this aim can be achieved by adjusting the suction pressure in the mineral wool at a determined value using a capillary system with which water can also be supplied and/or discharged.

Should a particular plant (cultivated under a water-/air management which can be set exactly) absorb water out of the mineral wool, a very small increase in the suction pressure will occur locally and temporarily. This is compensated for either directly or instantaneously by supplying water via the capillary system. It is very important to note here that this supply of water is exactly equal to the quantity of water taken up by the plant. The same applies with regard to compensation for the amount of water which evaporates and/or drains out of the mineral wool.

The suction pressure in the mineral wool is maintained at the constant, optimal value, so that neighbouring and other plants are in no way affected by water absorption by another plant. The air/water management thus remains substantially undisturbed.

It is noted that in open ground underground supply of water via a capillary line is known (Technical Information Reko Pearl; the grow tube, Charles H. Cordewener, October 1986).

Soil differs greatly in structure and texture from mineral wool. Soil has for example a density of 1.0–1.6 $g/cm^3$ (mineral wool 0.04–0.1 $g/cm^3$), and a porosity of 40–50% (mineral wool 90–95%). The most characteristic difference which is directly related to the water management is the difference in pore size distribution between soil and mineral wool. A pore size distribution of clay soil (P. Schachtschabel et al, Lehrbuch der Bodenkunde, 1982, p. 158) and mineral wool is for example shown in the table.

This means that soil has a pF curve differing widely from that of mineral wool. Soil can take up considerably less water, up to 40–50% by vol. (mineral wool up to 90–95% by vol.), but can retain water considerably better, suction pressure 125–20,000 cm water column (P. Schachtschabel et al, id.) (mineral wool 0–20 cm water column) (Chr. Blok, Grodan product information: Capillary dynamics (1985).

This means that soil is less quickly exhausted of water and as a result is highly safe for cultivating plants. An inherent disadvantage, however, is that the oxygen concentration of the soil can only be controlled by a comparatively great change in the suction pressure. On the other hand soil possesses a highly non-homogeneous mineral composition (clay, silt, sand) as a result of which it has a large exchanging capacity for minerals. This implies that the electrical conductivity (EC) can only be poorly controlled. Because of the irregular pore size, the washing characteristic is poor. The latter results in a high drainage percentage of >20%.

Mineral wool on the other hand is highly porous and possesses a low density and distinct pore size distribution, while the structure and texture is substantially constant. This means that with only a relatively small change in the suction pressure (5 cm. water column) mineral wool easily takes up a lot of water, but can also lose it very easily. This involves great risks where control of the water/air management is concerned. When there is a water supply which differs from the current requirement during cultivation, this can lead to large variations in the moisture content of the mineral wool, which are of enormous significance for the cultivation of plants.

The French patent application 2,297,562 discloses a system of growing plants in an open container filled with finely divided sand. Water and optionally nutrients are fed to the container at a constant pressure of 0.1–0.2 kg/cm$^2$. This pressure is chosen such that the amount of water added equals the average daily water consumption during the whole season, which quantity is 5 liters/m$^2$/day for tomatoes and 4 liters/m$^2$/day for lettuce. However, the water consumption differs significantly over the day and night period. At night the water consumption varies between 0–100 ml/m$^2$/hour while between 12:00 and 14:00 may be as high as 6000 ml/m$^2$/hour. The amount of water added is proportional to the sum of the water pressure in the inlet pipe and the suction pressure in the sand bed.

Accordingly in the French cultivation system the amount of water added during the night time is larger than the actual demand but during the day time is significantly less than the actual water demand. In other words during the night the sand bed is almost completely saturated with water whereas during the day time the water stored in the sand bed is used up to a large extent.

Such a system of confronting daily plants with an excess and a shortage of water cannot be used in a mineral wool culture because of the form of the pH curve, namely at a suction pressure of about 20 cm. water column the mineral wool hardly contains any water and the extraction of a relatively small amount of water will result in a tremendous increase of the negative pressure beyond the wilting point.

Although this conventional container filled with sand is provided with a discharge pipe, water is only discharged after harvesting the plants at the end of the growing season in order to wash the sand bed; the main object of this French application is to avoid any circulation of water and nutrients through the sand bed.

BRIEF DESCRIPTION OF THE INVENTIONS

These problems of control can be avoided with use of the present invention, since a capillary system is employed for setting the water/air management in the mineral wool. This leads to maximum control of the air content, and the EC, while lower drainage percentages (20% or less) can be used, and optimal washing can take place if the EC has to be altered.

Because there are great differences between soil, sand and mineral wool in pore size distribution, structure and texture, in the greater risks which are taken in control of the water/air management, and in the magnitude of the suction pressure during operation (soil possesses in natural conditions a suction pressure up to 1,000 times greater than that of mineral wool), it was surprising for those skilled in the art that in mineral wool culture using a capillary system the water/air management can be controlled in advantageous manner, while any drawbacks and negative consequences can be avoided. Particularly the much smaller amount of water necessary for drainage offers possibilities of reducing the cost of water, fertilizers and disinfecting of drainage water.

The current invention relates on the one hand to a method for the mineral wool culture of plants, whereby water and any fertilizers that may be comprised therein are supplied to, and if necessary discharged from, the mineral wool in which the plant grows, characterized in that in said mineral wool the suction pressure is adjusted using a capillary system connected for liquid communication with mineral wool, with which capillary system water and any required nutrients are actively supplied to and/or discharged from said mineral wool, in order to readjust the predetermined suction pressure. The invention relates on the other hand to a device for the mineral wool culture of plants, comprising: mineral wool in which the plants can grow; means for supplying water and any fertilizers that may be comprised therein to said mineral wool; and means for discharging water and any fertilizers that may be comprised therein from said mineral wool, characterized by a capillary system connected for liquid communication with said mineral wool, to which system are linked means for adjusting the suction pressure in said mineral wool in which the plant grows, and means for determining the actual suction pressure of the mineral wool, and based on the determined actual suction pressure control the amount of water supplied by the water supplying means and/or discharged by the water discharging means.

Although the suction pressure can be set at a value to be determined by the grower, it is however recommended that the suction pressure is maintained at a constant value in the mineral wool, as a result of which the plant is subjected continuously to optimal conditions. For fast growing plants, for instance vegetables, the suction pressure amounts to 5 cm water column for slow growing plants, for example flower crops, the suction pressure amounts to 10 cm water column.

Characteristic for the invention is that via the capillary system water and any required fertilizers are either supplied or discharged, or supplied and discharged in combination. The suction pressure setting means to be used thereby comprise a pump, a siphon or other known means with which a determined hydrostatic pressure can be applied to the capillary system and maintain therein the predetermined suction pressure despite a determined flow of water in the capillary system.

In accordance with a first embodiment the capillary element is a perforated capillary tube which extends through the rockwool. In accordance with a second embodiment the capillary element consists of a number of perforated capillary tubes located adjacent to one another, which connect onto a main tube and are inserted into the rockwool, and the main tube is connected to the suction pressure setting means. This so-called capillary rake has the advantage that if one of the tubes becomes blocked water and any fertilizers can be supplied, and if necessary discharged, via the remaining tubes.

According to a third embodiment the capillary element consists of a strip of mineral wool, or equivalent elements such as a sand bed or a fibre bed of another type of fibre, such as textile and the like.

In order to make the costs for sprinkling water and the load on the environment as small as possible, it is recommended that the water discharged from the mineral wool is recirculated, whereby the recirculated water is preferably disinfected.

The mineral wool in which the plants grow can be completely or partially enclosed at the top or bottom by a liquid-tight material, as a result of which evaporation or environmental influences can be counteracted. If in this case at least one passage is arranged in the watertight material, via which passage the capillary system is connected for liquid communication with the mineral wool in which the plant grows, a desired flow pattern of the water and any required fertilizers can be realized without many "blind spots", as a result of which a change in the EC or a washing can be effected more quickly with a smaller quantity of water. Use can be made in this case moreover of standard matting.

If the mineral wool and the capillary element are enclosed by a liquid-tight material, the grower can make use of a ready-made culture system according to the invention which only needs to be connected up to the suction pressure setting means.

If as preferred the capillary system and the plants are separated from each other by a barrier impenetrable by plant roots, break-down of the capillary system as a consequence of root ingrowth is prevented. The impenetrable barrier consists preferably of an anti-root sheet, of which only small quantities are necessary, if in preference the barrier that is impenetrable by roots is arranged only in the passage through the watertight material.

Control of the suction pressure via the supply of water and any required fertilizers is realized if water that may be provided with fertilizers is preferably supplied to the rockwool in which the plant grows via the capillary system with the set suction pressure.

Control of the suction pressure over the discharge is possible if water that may be provided with fertilizers is preferably discharged from the rockwool in which the plant grows via the capillary system with the set suction pressure.

It is remarked that a combination of the control over the supply and discharge of water and any required fertilizers also falls within the scope of the current invention.

With respect to control of the suction pressure over the discharge of water it is noted that it is thereby necessary to avoid as far as possible the occurrence of plant infection as a result of recirculated water. This can be realized for example if the choice of overflow percentage is on the higher side.

BRIEF DESCRIPTION OF THE DRAWINGS

Mentioned and other characteristics of the method and device according to the invention will be elucidated hereinafter with reference to a number of embodiments, which are given only by way of example, and explained in the annexed drawings.

In the drawing:

FIGS. 1 and 5 each show a mineral wool culture system whereby in the mineral wool the suction pressure is set using a capillary system;

FIG. 2 shows on a larger scale a partly broken away perspective view of detail II from FIG. 1;

FIG. 3 is a section along the line III—III from FIG. 1 on another scale;

FIGS. 4, 6, 7 and 8 each show a perspective, partly broken away view of other embodiments of parts of the capillary system.

DETAILED DESCRIPTION OF THE PREFERRED EMBODIMENTS

Figure 9:
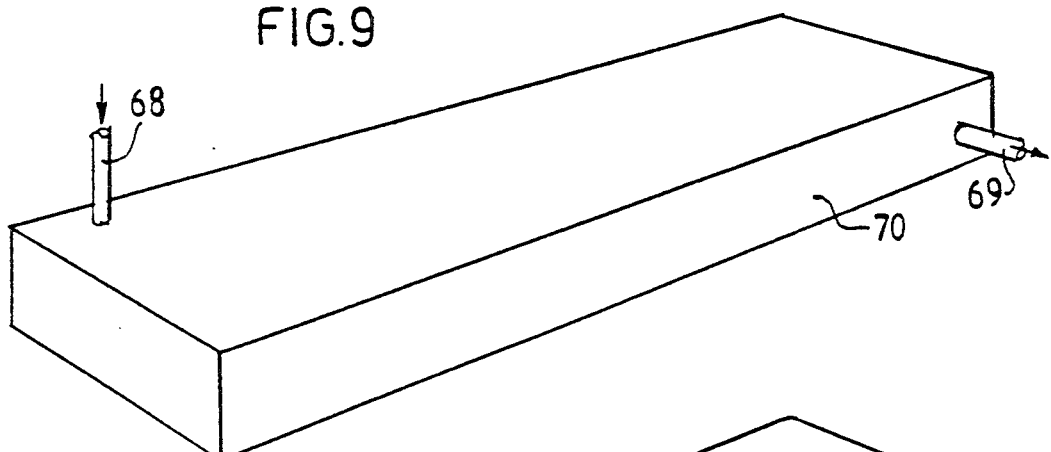
FIGS. 9 and 10 show schematically various possible orientations for intakes and outlets for a grow mat, whereby an optimal flow pattern through the grow mat can be effected.

FIGS. 1-3 show a device 1 for the mineral wool culture of plants 2. The device comprises a grow mat 3, which may be enclosed by a plastic envelope, onto which are placed grow blocks 4 which are connected for liquid communication with grow mat 3. The roots of the plants 2 initially planted in grow blocks 4 extend during cultivation into and through the grow mat 3. Water 6 and any required fertilizers are extracted from the grow mat 3.

The device 1 is characterized according to the invention by a capillary system 7 with which water 6 (FIG. 3) and fertilizers are in this case fed to the mineral wool 8, for example rockwool or glass wool, of the grow mat 3.

The capillary system with which the suction pressure in the grow mat 3 is set and maintained comprises capillary elements 9 which consist of tubes 9 provided with perforations 10 (diameter 0.05-0.3 mm, preferably 0.1 mm). The tubes 7 provided with perforations 10 are inserted parallel to one another into grow mat 3. The water present in the tubes 9 is in capillary communication with the mineral wool 8 in grow mat 3 via the perforations 10.

The capillary tubes or elements 9 are connected on the other side to a feed tube 11. The actual suction pressure in the grow mat 3 is determined in a computer 12 connected with a humidity sensor 13, sunlight intensity sensor 14, and a hygro/EC sensor 15 stuck into the grow mat 3. The computer 12 (for example comprising a computer programme of the Penmann model) determines the actual need for water and actuates a pump 16 connected to the feed tube 11.

Thus, irrespective of the water requirement of the individual plants 2, irrespective of the discharge of water 17 (see FIG. 3) and irrespective of the washing percentage, the suction pressure can be maintained at a set value.

FIG. 3 shows that the grow mat 3 rests in a tray 19 on blocks 18. Excess water is released via discharge 20. This prevents a flowback of discharged water 17 towards the grow mat 3 and eventual cross-infection.

FIG. 4 shows a device 21 according to the invention for mineral wool culture of plants 2 which, initially cultivated in germinating plugs 22, have expanded with roots 5 into the grow mat 23.

As in the prior embodiment, the device 21 comprises a capillary system 7, which in this case consists of two capillary mats, a capillary feed mat 24 and a capillary discharge mat 25. Both mats 24 and 25 are separated from each other and connected for liquid communication with grow mat 23 via a barrier (an anti-root sheet 26) that is impenetrable by plant roots 5. Water 27, with any required fertilizer and at a determined suction pressure, is fed to the capillary feed mat 24, while water leaves the device 21 via discharge mat 25.

Device 21 is a closed through-flow system in which the suction pressure of the intake and discharge can be exactly controlled, because the discharge mat 25 is connected to a pump which can discharge water from the mat 25 and is controlled and actuated by a similar computer 12 as shown in FIG. 1. It is even possible if necessary to feed extra water and/or fertilizers via drippers to for instance the germinating plugs 22.

FIG. 5 shows a device 29 for mineral wool culture of plants according to the invention in which a closed capillary system 7 is also used.

The device comprises a grow mat 30 into which are inserted perforated capillary feed tubes 31 and, at a lower level, perforated capillary discharge tubes 32.

The device 29 comprises a computer 33 for controlling the suction pressure and the EC in the grow mat 30. Connected to the computer 33 are a hygrometer and EC meter 34 connected to grow mat 30, a thermometer 35 and a light intensity meter 36. Depending on the signals transmitted by meters 34–36, the computer 33 actuates a valve 37 in the short-circuit line 38 over the pump 39 so that the hydrostatic pressure, or suction pressure, can be adjusted in the pipes 40 and 41 connected to the feed tubes 31 and discharge tubes 32 respectively.

Pump 39 receives fresh water supplied from the fresh water reservoir 42 and recirculated water via the recirculation water reservoir 43, this water being first disinfected in a disinfecting device 44, in which disinfecting is carried out with for example heat, ozone or UV radiation.

Finally, located in pipe 40 is an expansion tank 45 and a line 47 provided with a valve 46 for fertilizers 48. Valve 46 can be operated with the computer 33.

FIG. 6 shows a variant of the capillary system 7, which consists of a layer of mineral wool 49 which is connected via a discharge 50 to suction pressure setting means described in FIGS. 1 and 5. A grow mat 52 with plants 2 is placed with interposition of an anti-root sheet 51 onto the layer of mineral wool 49. Water and any required fertilizers are fed via drippers 53 to the grow blocks 54.

In this case control of the suction pressure in the grow mat 52 is carried out via drainage control, as a result of which re-use of discharged water 55 and control of the EC and salt concentrations are quite possible, while washing can be carried out properly. The drainage percentage can moreover be determined almost exactly.

FIG. 7 shows a capillary system 7 equivalent to that in FIG. 6. This system 7 consists of a strip of mineral wool 56 which is enclosed by anti-root sheet 57 and enclosed together with the grow mat 58 by a watertight material 59, for instance polythene, in which are arranged passages 60 for plants. The outlet 61 which extends through the strip of mineral wool 56 carries away water and any fertilizers and determines the suction pressure prevailing in grow mat 58.

FIG. 8 shows another capillary system 7, whereby in addition the use of anti-root sheeting is restricted, because arranged in the bottom of the watertight material 59 are small passages.

The water supplying capillary element 64 consists of a number of perforated capillary tubes 66 located adjacent to one another, which connect onto a main tube 65 and which are to be inserted into the mineral wool. This capillary element in rake form is inserted through the watertight material 59 into the mineral wool and provides a large number of water delivery points located at mutual intervals from one another in the form of the capillary tubes 66. Blockage of a capillary tube 66 will hardly lead to damaging consequences, because the feed of water will be taken over via neighbouring capillary tubes 66. Because use is made in addition of a bed-like capillary discharging element 67, FIG. 8 shows a closed capillary system 7.

The flow pattern of water and any required fertilizers through the grow mat is determined by the relative positioning of water feeds and discharges from one another. In FIG. 6 transport is carried out substantially vertically over the height of grow mat 52, in FIG. 7 substantially over a portion of the width of grow mat 52 and in FIG. 8 substantially over the length of the grow mat.

Figure 10:
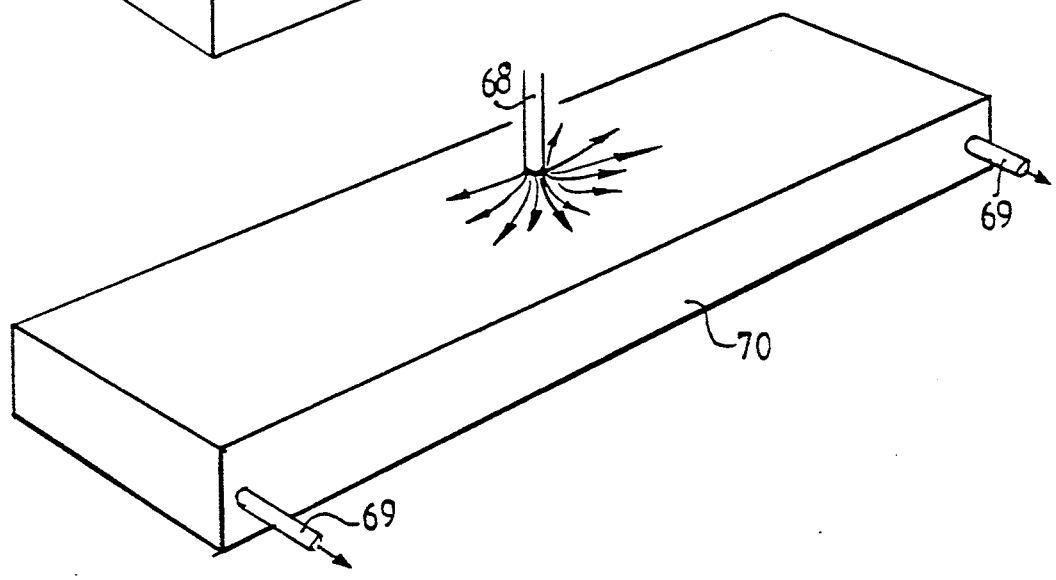

FIGS. 9 and 10 show other orientations of the feed 68 and discharge 69 for the grow mat 70, whereby the greatest possible effort has been made to provide flow of water and/or fertilizers through the whole grow mat 70 and to avoid blind spots as far as possible. Thus is created a grow mat allowing good through-flow and, where necessary, washing, and in which according to the invention the suction pressure can be set optimally or controlled to suit the requirements of the grower and/or of an optimal cultivation yield.

TABLE

Derivation of pore size distribution from water retention curves

| Grodan PL Rockwool (max. water filling 92%) | | | | Clay soil, A-horizon (max. water filling 55%) | | | |
| --- | --- | --- | --- | --- | --- | --- | --- |
| S | Re. (μm) | % water | no. of pores | S | Re. (μm) | % water | no. of pores |
| 2.5 | 56 | 87 | $5 \times 10^8$ | 50 | 2.800000 | 50 | $2.0 \times 10^{11}$ |
| 5 | 28 | 67 | $8 \times 10^9$ | 316 | 0.443038 | 45 | $8.1 \times 10^{12}$ |
| 7.5 | 19 | 49 | $1.6 \times 10^{10}$ | 1259 | 0.111199 | 40 | $1.3 \times 10^{14}$ |
| 10 | 14 | 33 | $2.6 \times 10^{10}$ | 25119 | 0.005573 | 30 | $1.0 \times 10^{17}$ |
| 12.5 | 11 | 28 | $1.3 \times 10^{10}$ | 251189 | 0.000557 | 20 | $1.0 \times 10^{19}$ |
| 15 | 9 | 25 | $1.1 \times 10^{10}$ | 1584893 | 0.000088 | 10 | $4.1 \times 10^{20}$ |
| 17.5 | 8 | 21 | $2.0 \times 10^{10}$ | 10000000 | 0.000014 | 0 | $1.6 \times 10^{22}$ | where:
S = suction pressure in negative cm. water column
Re = equivalent diameter (in μm) of the pores which are drained

I claim:

1. A method for the mineral wool culture of plants, said method comprising the steps of:
   providing a plurality of mineral wool grow mat portions;
   providing a capillary system in liquid communication with the plurality of mineral wool grow mat portions;
   supplying water and optional nutrients through the capillary system to the mineral wool grow mat portions and enabling the water and optional nutrients to discharge from the plurality of mineral wool grow mat portions;

actively maintaining and adjusting a suction pressure which develops in the plurality of wool mat portions at a predetermined value with a suction pressure setting means so as to obtain a predetermined hydrostatic pressure in the capillary system; and providing means for preventing water and optional nutrients which may discharge from any one of said mineral wool grow mat portions from being supplied to any other one of said mineral wool grow mat portions.

2. Method as claimed in claim 1, in which the capillary system comprises at least one capillary element connected for liquid communication with the mineral wool grow mat portions.

3. Method as claimed in claim 2, in which the capillary element is a perforated capillary tube which extends into the mineral wool grow mat portions.

4. Method as claimed in claim 3, in which the capillary element is a rake of perforated capillary tubes located adjacent to one another and inserted into the mineral wool grow mat portions, each of which is connected to a manifold and said manifold is connected to the suction pressure setting, maintaining and adjusting means.

5. Method as claimed in claim 2, in which the capillary element is a strip of mineral wool mat.

6. Method as claimed in claim 2, in which each of the mineral wool grow mat portions is at least partially enclosed by a respective liquid-tight material.

7. Method as claimed in claim 6, in which arranged in the respective liquid-tight material is at least one passage through which passage the capillary system is connected for liquid communication with the mineral wool grow mat portions.

8. Method as claimed in claim 6, in which each of the mineral wool grow mat portions and at least part of the capillary system associated therewith are enclosed by the liquid-tight material.

9. Method as claimed in claim 1, in which the capillary system and the plants are separated from each other by a barrier impenetrable by plant roots.

10. Method as claimed in claim 1, in which the predetermined suction pressure value is about 0 to about 20 cm. water column.

11. Method as claimed in claim 10, in which the predetermined suction pressure value is 5 to 10 cm. water column.

12. Method as claimed in claim 1, in which the mineral wool grow mat portions are physically connected with one another.

13. Method as claimed in claim 1, in which the plurality of mineral grow mat portions are physically spaced from one another.

14. Method as claimed in claim 1, further comprising actively discharging the water and optional nutrients from the mineral wall grow mat portions.

15. Method as claimed in claim 1, further comprising actively supplying the water and optional nutrients to the mineral wall grow mat portions.

16. Method as claimed in claim 1, further comprising actively supplying to and actively discharging from the mineral wall grow mat portions the water and option nutrients.

17. A device for the mineral wool culture of plants, comprising:

a plurality of mineral wool grow mat portions;

a capillary system in liquid communication with the plurality of mineral wool grow mat portions;

means for supplying water and optional nutrients through the capillary system to the mineral wool grow mat portions and for enabling said water and optional nutrients to discharge from the mineral wool grow mat portions;

means for setting, maintaining and actively adjusting a suction pressure in the capillary system so as to obtain a predetermined hydrostatic pressure in the capillary system; and means for preventing water and optional nutrients which may discharge from any one of said mineral wool grow mat portions from being supplied to any other of said mineral wool mat portions.

18. Device as claimed in claim 17, in which the suction pressure setting, maintaining and adjusting means comprises a suction pressure sensor, pump means and means to control said pump means connected to said pump means and said sensor means.

19. Device as claimed in claim 17, in which the capillary system comprises a perforated capillary tube which extends into the mineral wool grow mat portions.

20. Devices as claimed in claim 17, in which the capillary system is a rake of perforated capillary tubes located adjacent to one another extending into the mineral wool grow mat portions, each of which is connected to manifold, and said manifold is connected to the suction pressure setting, maintaining and adjusting means.

21. Device as claimed in claim 17, in which the capillary system comprises a strip of mineral wool.

22. Device as claimed in claim 17, in which each of the mineral wool grow mat portions is at least partially enclosed by a liquid-tight material.

23. Device as claimed in claim 22, in which is arranged in the liquid-tight material at least one passage through which the capillary system is connected for liquid communication with the mineral wool grow mat portions.

24. Device as claimed in claim 22, in which at least part of the capillary system is also enclosed by the liquid-tight material.

25. Device as claimed in claim 17, in which the capillary system in the mineral wool grow mat portions is separated from sites thereof at which plants will be disposed by a barrier which is impenetrable by plant roots.

26. Method as claimed in claim 17, in which the plurality of mineral grow mat portions are physically connected with one another.

27. Method as claimed in claim 17, in which the plurality of mineral grow mat portions are physically spaced from one another.

28. Device as claimed in claim 17, wherein the water and optional nutrients are actively discharged from the mineral wall grow mat portions.

29. Device as claimed in claim 17, wherein the water and optional nutrients are actively supplied to the mineral wall grow mat portions.

30. Device as claimed in claim 17, wherein the water and optional nutrients are both actively supplied to and actively discharged from the mineral wall grow mat portions.

* * * * *